United States Patent
Carlson

(10) Patent No.: US 6,175,458 B1
(45) Date of Patent: Jan. 16, 2001

(54) CONTROL OF SERVO TIMING MARK DETECTION WINDOWS

(75) Inventor: Lance Robert Carlson, Niwot, CO (US)

(73) Assignee: STMicroelectronics N.V. (NL)

( * ) Notice: Under 35 U.S.C. 154(b), the term of this patent shall be extended for 0 days.

(21) Appl. No.: 09/222,225

(22) Filed: Dec. 29, 1998

Related U.S. Application Data

(60) Provisional application No. 60/076,359, filed on Feb. 27, 1998.

(51) Int. Cl.[7] .............................. G11B 5/09; G11B 15/12; G11B 5/596

(52) U.S. Cl. ................................. 360/51; 360/53; 360/63; 360/77.08

(58) Field of Search ........................... 360/51, 53, 77.02, 360/77.08, 48, 61, 63, 64

(56) References Cited

U.S. PATENT DOCUMENTS 6,067,206 * 5/2000 Hull et al. ......................... 360/77.08

* cited by examiner

Primary Examiner—W. Chris Kim
Assistant Examiner—Regina Y. Neal
(74) Attorney, Agent, or Firm—Theodore E. Galanthay; Lisa K. Jorgenson; William J. Kubida

(57) ABSTRACT

A disk drive processing system controls a Servo Timing Mark (STM) detection window in disk drive during a head switch operation. In response to the head switch operation, the system disables a timer that closes the STM detection window during normal operation, and the system tracks the elapsed time from a time point. The system compares the elapsed time to a programmable limit value. The system resumes normal operation if an STM is detected before the elapsed time reaches the programmable limit value and initiates a recovery procedure if the elapsed time reaches the programmable limit value. Advantageously, the programmable limit value can be easily re-programmed if a larger STM detection window is required due to severe STM or head mis-alignment.

12 Claims, 3 Drawing Sheets

US 6,175,458 B1

CONTROL OF SERVO TIMING MARK DETECTION WINDOWS

RELATED APPLICATION

This patent application references U.S. provisional patent application No. 60/076,359, filed on Feb. 27, 1998.

BACKGROUND OF THE INVENTION

1. Field of the Invention

The invention is related to the field of disk systems, and in particular, to a system that controls a servo timing mark detection window.

2. Statement of the Problem

FIG. 1 depicts a current disk drive that includes a disk device 100 and a disk drive processing system 130. Those skilled in the art are aware that numerous conventional aspects of the disk drive are not shown for clarity. The center of the disks 101–102 are each attached to a perpendicular spindle 107. A spin motor 108 spins the spindle 107 and the disks 101–102 at a constant rate. The heads 103–106 read information that is stored on the disks 101–102. The heads 103–106 pass signals containing this information to a pre-amp 120. The pre-amp 120 passes only one of the signals from a selected head to the read channel 121 where the signal is processed into a format suitable for a processor 131. The processed signal (or signals) is then passed to the processor 131 in the disk drive processing system 130. The processor 131 executes firmware stored in the memory 134 to control the operation of the disk drive. This includes positioning the heads 103–106 relative to the disks 101–102 and exchanging user information with the disks 101–102. The processor 131 and memory 134 could be a single integrated circuit or a group of integrated circuits.

The disks 101–102 each contain circular tracks that store both servo data and user data. The servo data includes position information that allows the disk drive processing system 130 to identify locations on the disks 101–102. The servo data is uniformly spaced around the tracks of the disk, so that the heads 103–106 regularly encounter servo data as the disks 101–102 spin. Thus, the servo data is read at regularly spaced time intervals based on the constant spinning rate and uniform placement around the disk.

The servo data contains servo timing marks (STMs). STMs are used to locate and identify the corresponding servo data. An example of an STM may be no magnetic transitions on the disk for 350 nanoseconds followed by one magnetic transition followed by no magnetic transitions for another 350 nanoseconds. Each STM must be detected during a period of time known as a STM detection window that is generated by the disk drive processing system 130. The STM detection window prevents false STM detection in cases where user data has similar characteristics to the STM. False STM detection can cause a catastrophic failure of the disk drive. The processor 131 may be used to detect the STM during the STM detection window, or additional circuitry (hardware) may be used for STM detection.

The processor 131 opens and closes the STM detection window by using the hardware timers 132–133. FIG. 2 illustrates this process. The processor 131 starts the hardware timer 132 when the first STM is detected in the signal. When the hardware timer 132 expires, the STM detection window opens for detection of the second STM. The false STM located before the STM detection window opens is ignored. The second STM is used by the disk drive processing system 130 since it is detected while the STM detection window is open. The processor 131 starts the hardware timer 133 at the opening of the STM detection window, and the STM detection window closes when the hardware timer 133 expires. The false STM located after the STM detection window closes is ignored.

Head switch operations add complexity to STM detection. During a head switch operation, the pre-amplifier 120 switches the signal that it passes to the disk drive processing system 130. For example, the pre-amplifier 120 might pass a signal from the head 103 before the head switch and pass a signal from the head 106 after the head switch. It should be appreciated that during a head switch operation, the processor 131 must detect successive STMs in two different signals.

FIG. 3 depicts the head switch problem. The first STM may come from the head 103 signal, and after a head switch, the second STM may come from the head 106 signal. Physical mis-alignment between the heads 103 and 106 can cause timing misalignment between the first and second STMs as shown in FIG. 3. In this case, the hardware timers 132–133 may fail to keep the STM detection window open until the second STM is detected. On FIG. 3, the legitimate second STM would be ignored since it is detected after the STM detection window closes. A failure to detect the STM requires a recovery procedure before normal operation can resume.

Mis-alignment is caused by thermal warping in mechanical assemblies or disk slippage from physical shock or handling. Removable media drives pose additional alignment problems. The servo data on removable disks is written by equipment that has different mechanical alignment than the actual disk drive used to read and write to the removable disks.

The current solution to this problem is to simultaneously reduce the length of the hardware timer 132 and increase the length of the hardware timer 133 during a head switch operation. This lengthens the STM detection window during a head switch operation to account for some mis-alignment. Unfortunately, the maximum length of the increase for hardware timer 133 must be estimated and fixed during the design of the hardware in the disk drive processing system 130. If this design does not provide the proper amount of additional time, STM detection might fail during head switch operations where severe misalignment is present.

The normal duration of an STM detection window is 2–6 microseconds. This is typically increased to 20 microseconds during a head switch operation. Since the STM detection window is centered around the expected moment of STM detection, the STM detection window has 10 microseconds before and after the expected detection time point. Unfortunately, STM shifts of 50 microseconds or more can occur due to severe misalignment during head switch operations, especially with removable media drives. Redesigning the disk drive processing system 130 to increase the length of hardware timer 133 would be costly and impractical.

SUMMARY OF THE SOLUTION

The invention solves the above problem with a disk drive processing system that controls a Servo Timing Mark (STM) detection window during a head switch operation. In response to the head switch operation, the system disables the hardware timer that closes the STM detection window during normal operation, and the system tracks the elapsed time from a time point. The system compares the elapsed time to a programmable limit value. The system resumes normal operation if an STM is detected before the elapsed time reaches the programmable limit value and initiates a recovery procedure if the elapsed time reaches the programmable limit value.

The invention is advantageous because the limit value is programmable and is not limited by hardware since measurement of elapsed time is typically implemented in software and can span times much longer than the 50 microsecond or more STM timing mis-alignment during head switch operations. If severe mis-alignment is encountered during head switch operations, then the limit value can be increased to provide an STM detection window of the appropriate length. In contrast, the prior art system might be able to re-program hardware timers with new values, but these values would be unacceptably limited because of the fixed hardware design. A replacement of hardware would be required or the timers would need to be designed with numerous timer length selections. Both of these solutions are more complex and expensive than the present invention.

DETAILED DESCRIPTION OF THE INVENTION

Figure 4:
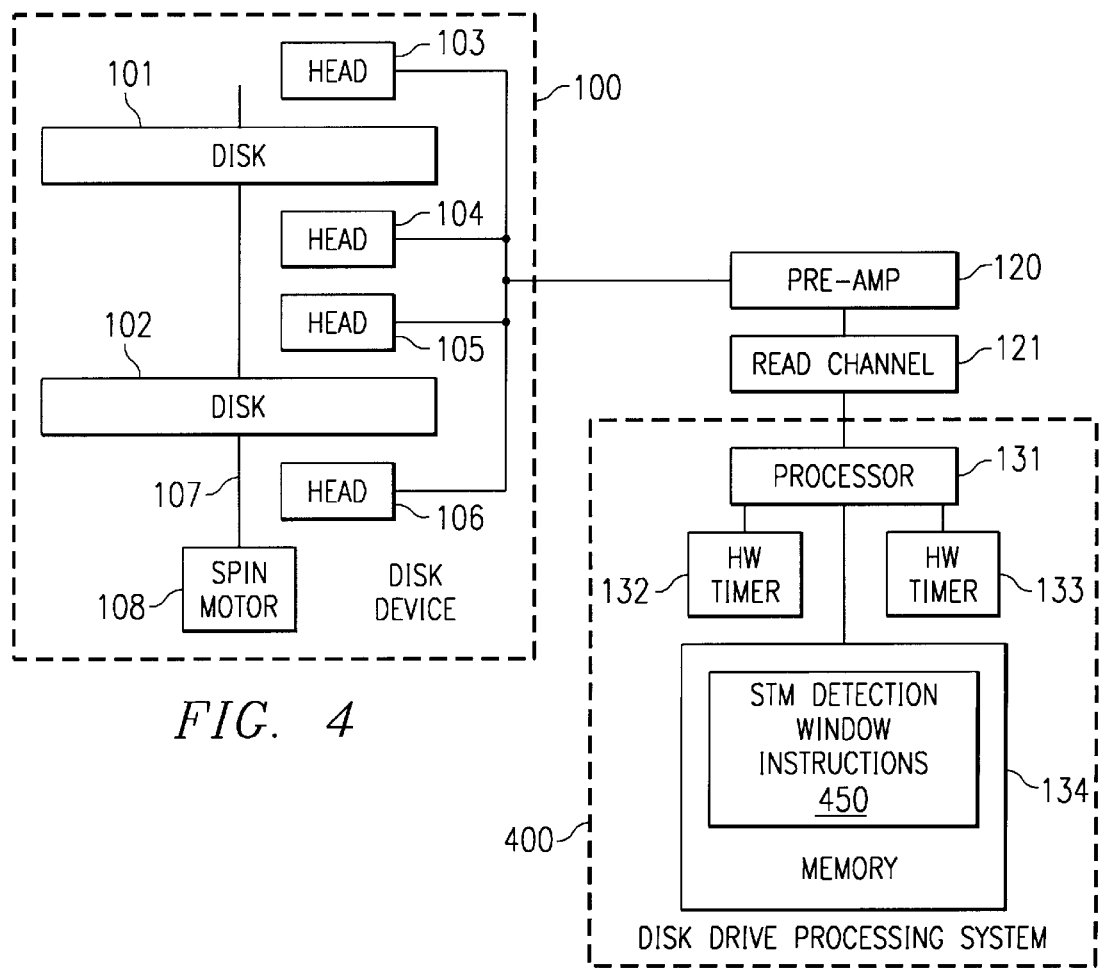
FIG. 4 is a block diagram of a disk drive in an example of the invention.

FIG. 4. depicts a disk drive in accord with the present invention and that includes the disk device 100 and a disk drive processing system 400. Those skilled in the art are aware that numerous conventional aspects of the disk drive are not shown for clarity. The center of the disks 101–102 are each attached to the perpendicular spindle 107. The spin motor 108 spins the spindle 107 and the disks 101–102 at a constant rate. The heads 103–106 read information that is stored on the disks 101–102. The heads 103–106 pass signals containing this information to the pre-amp 120. The pre-amp 120 passes only one of the signals from a selected head to a read channel 121 where the signal is processed into a format suitable for a processor 131. The processed signal (or signal) is then passed to the processor 131 in the disk drive processing system 400. The processor 131 executes firmware stored in the memory 134 to control the operation of the disk drive. This includes positioning the heads 103–106 relative to the disks 101–102 and exchanging user information with the disks 101–102. In accord with the present invention, the processor 131 executes STM detection window instructions 450 included in the firmware in the memory 134 to control the STM detection window. The processor 131 and the memory 134 could be a single integrated circuit or a group of integrated circuits.

The disks 101–102 each contain circular tracks that store both servo data and user data. The servo data includes position information that allows the disk drive processing system 130 to identify locations on the disks 101–102. The servo data is uniformly spaced around the tracks of the disk, so that the heads 103–106 regularly encounter servo data as the disks 101–102 spin. Thus, the servo data is read at regularly spaced time intervals based on the constant spinning rate and uniform placement around the disk.

The servo data contains servo timing marks (STMs). STMs are used to locate and identify the corresponding servo data. An example of an STM may be no magnetic transitions on the disk for 350 nanoseconds followed by one magnetic transition followed by no magnetic transitions for another 350 nanoseconds. Each STM must be detected during a period of time known as a STM detection window that is generated by the disk drive processing system 400. The STM detection window prevents false STM detection in cases where user data has similar characteristics to the STM. False STM detection can cause a catastrophic failure of the disk drive. The processor 131 may be used to detect the STM during the STM detection window, or additional circuitry (hardware) may be used for STM detection.

Figure 1:
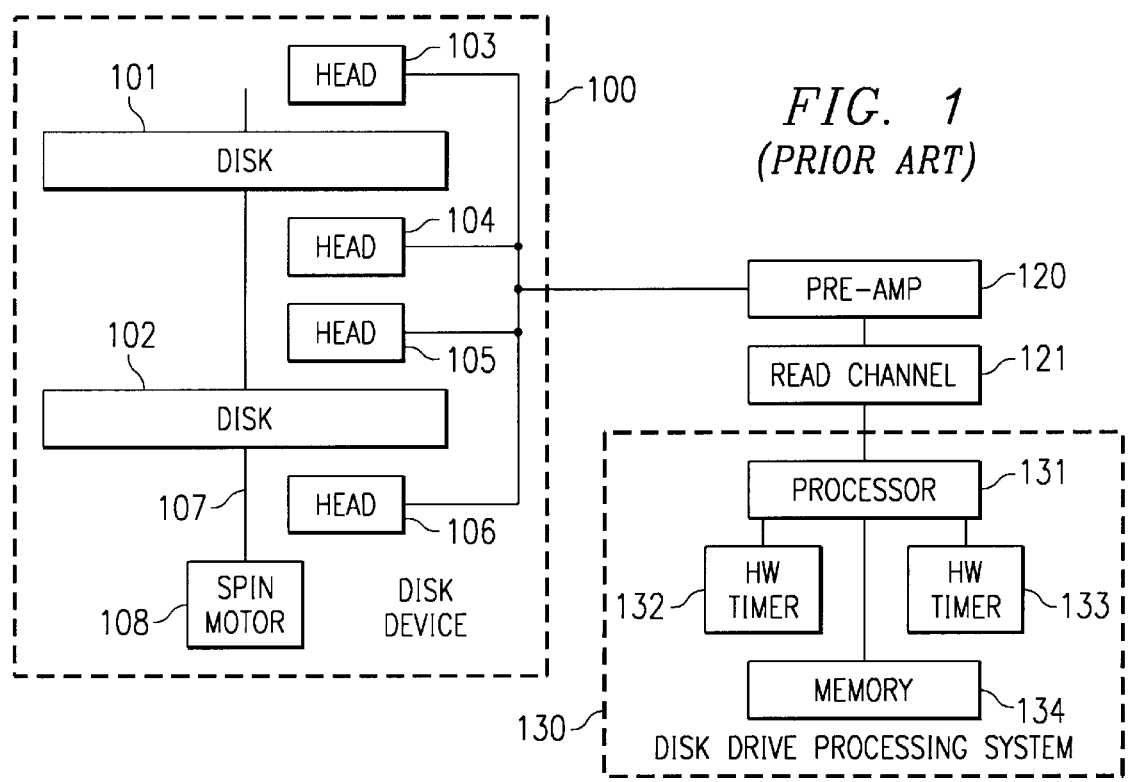
FIG. 1 is a block diagram of a disk drive in a prior system.
Figure 2:
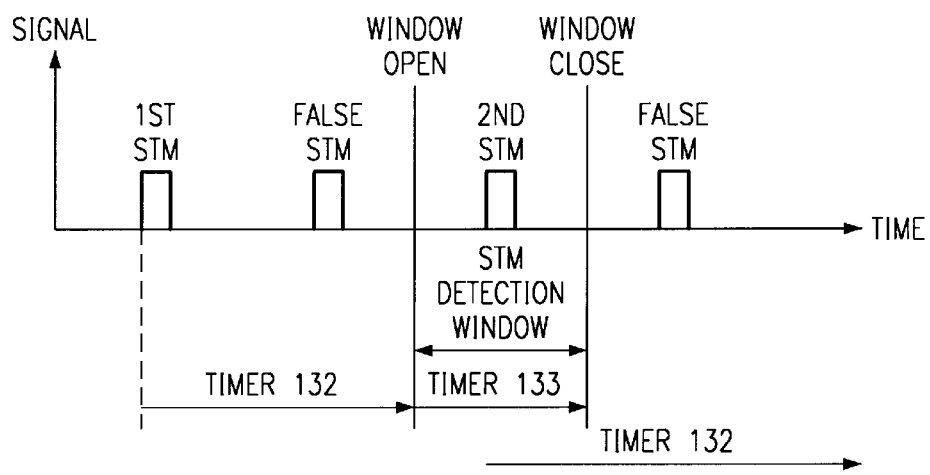
FIG. 2 is a timing diagram of an STM detection window in the prior system.
Figure 3:
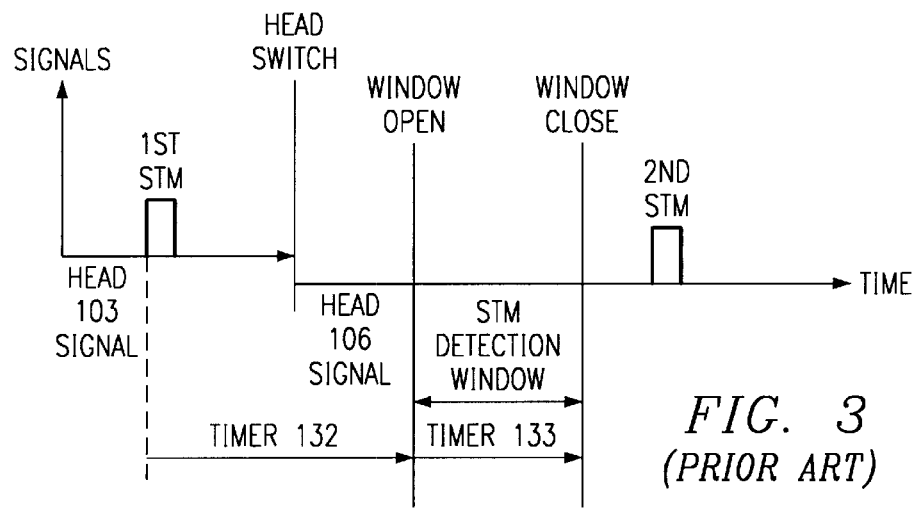
FIG. 3 is a timing diagram of an STM detection window during a head switch operation in the prior system.
Figure 5:
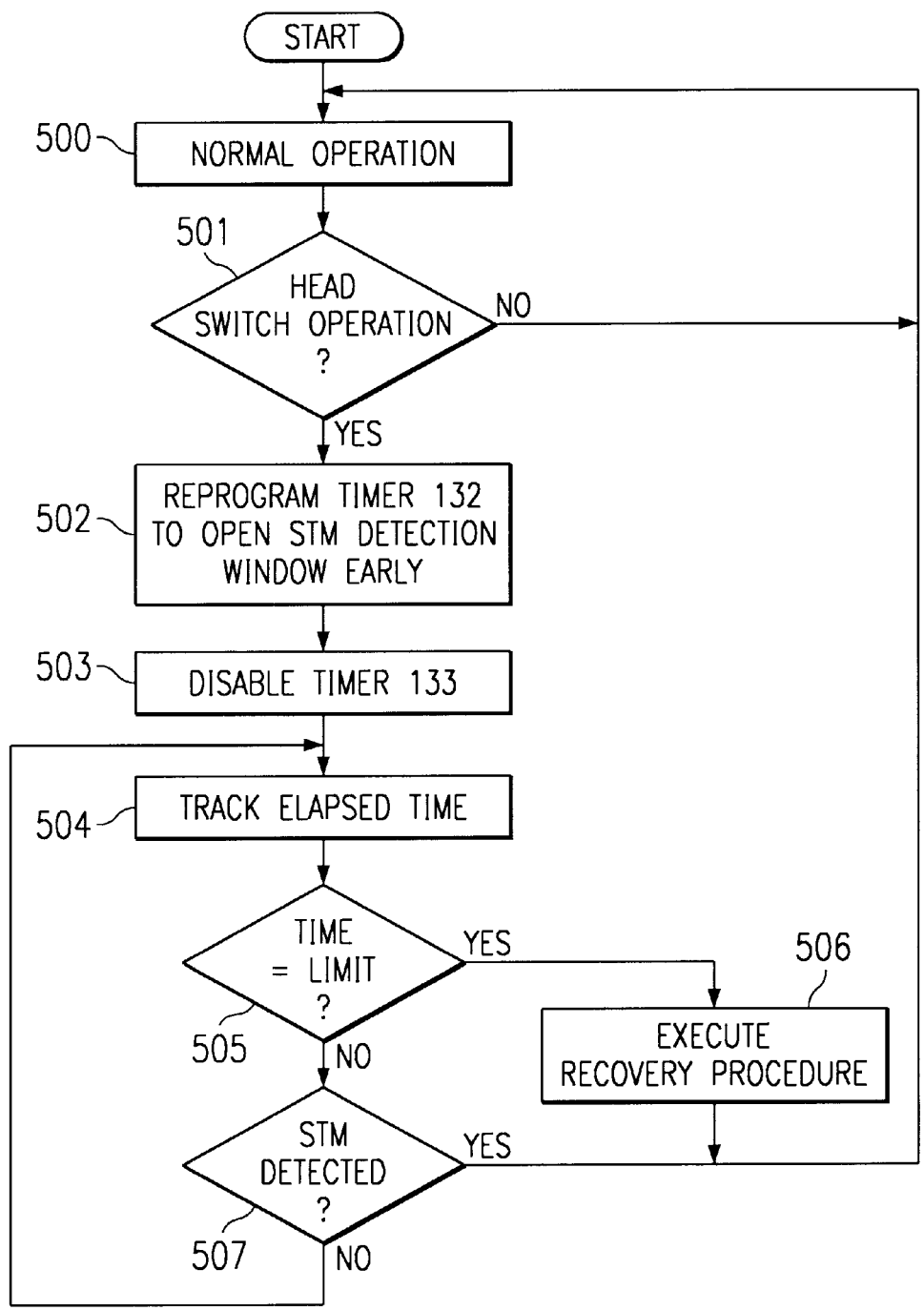
FIG. 5 is a flow chart of processor operation in an example of the invention.

FIG. 5 illustrates the operation of the processor 131 when executing the STM detection window instructions 450. The process starts with normal operation at step 500. Normal operation is described with reference to FIGS. 1 and 2. If a head switch operation is not required at step 501, then normal operation continues at step 500. If a head switch operation is required at step 501, then normal operation is suspended. The processor 131 re-programs the timer 132 to a shorter time period to open the STM detection window early at step 502. The processor 131 disables the timer 133 at step 503 to keep the STM detection window open for a longer period. Thus, the STM detection window opens earlier and closes later during a head switch operation. In step 504, the processor 131 then tracks the elapsed time since the last STM, or in the alternative, tracks the elapsed time since the opening of the STM detection window. The processor 131 compares the elapsed time to a programmable limit value indicating that error has occurred in step 505. If the elapsed time equals the limit value in step 505, then the recovery procedures are executed in step 506 and normal operation resumes in step 500. If the elapsed time does not equal the limit value in step 505, then the processor 131 checks for STM detection in step 507. If the STM is not detected in step 507, then the processor 131 continues to track elapsed time in step 504. If the STM is detected in step 507, then the processor 131 resumes normal operation at step 500.

The elapsed time can be tracked in various ways. An elapsed time since STM feature may be available. An interrupt could be sent to the processor 131 upon STM detection and timer hardware or firmware could be used to measure time. The processor 131 could also save a time stamp from the system clock in the disk drive processing system 130 and compare the time stamp to current system clock values.

The invention is advantageous because the limit value is programmable and is not limited by hardware. The limit value could be stored in a register or within the instructions 450. If severe mis-alignment is encountered during head switch operations, then the limit value can be increased to provide an STM detection window of the appropriate length. In contrast, the prior art system could not simply reprogram the hardware timers 132–133 with new values required to compensate for severe mis-alignment. A replacement of hardware would be required or the timers would need to be designed with numerous timer length selections. Both of these solutions are more complex and expensive than the present invention.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for controlling a Servo Timing Mark (STM) detection window in a disk drive during a head switch operation, the method comprising:

in response to the head switch operation, disabling a timer that closes the STM detection window during normal operation;

in response to the head switch operation, tracking an elapsed time from a time point;

comparing the elapsed time to a programmable limit value;

resuming the normal operation if an STM is detected before the elapsed time reaches the programmable limit value; and initiating a recovery procedure if the elapsed time reaches the programmable limit value.

2. The method of claim 1 further comprising in response to the head switch operation, reducing a timer that opens the STM detection window.

3. The method of claim 1 wherein the time point is a detection of a past STM.

4. The method of claim 1 wherein the time point is an opening of the STM detection window.

5. A processor-readable medium having instructions for performing a method for controlling a Servo Timing Mark (STM) detection window in a disk drive during a head switch operation, the method comprising:

in response to the head switch operation, disabling a timer that closes the STM detection window during normal operation;

in response to the head switch operation, tracking an elapsed time from a time point;

comparing the elapsed time to a programmable limit value;

resuming the normal operation if an STM is detected before the elapsed time reaches the programmable limit value; and initiating a recovery procedure if the elapsed time reaches the programmable limit value.

6. The processor-readable medium of claim 5, the method further comprising in response to the head switch operation, reducing a timer that opens the STM detection window.

7. The processor-readable medium of claim 5 wherein the time point is a detection of a past STM.

8. The processor-readable medium of claim 5 wherein the time point is an opening of the STM detection window.

9. A disk drive processing system that controls a Servo Timing Mark (STM) detection window during a head switch operation, the disk drive processing system comprising:

instructions responsive to the head switch operation to disable a timer that closes the STM detection window during normal operation, to track an elapsed time from a time point, to compare the elapsed time to a programmable limit value, to resume the normal operation if an STM is detected before the elapsed time reaches the programmable limit value, and to initiate a recovery procedure if the elapsed time reaches the programmable limit value;

a processor operational to execute the instructions; and a memory operational to store the instructions.

10. The disk drive processing system of claim 9 wherein the instructions are further responsive to the head switch operation to reduce a timer that opens the STM detection window.

11. The disk drive processing system of claim 9 wherein the time point is a detection of a past STM.

12. The disk drive processing system of claim 9 wherein the time point is an opening of the STM detection window.

* * * * *